(12) United States Patent
Lottini

(10) Patent No.: US 11,461,666 B2
(45) Date of Patent: Oct. 4, 2022

(54) SYSTEMS AND METHODS FOR BINARY TREE STORAGE

(71) Applicant: Gamesys Ltd., London (GB)

(72) Inventor: Alice Lottini, London (GB)

(73) Assignee: Gamesys, Ltd.

( * ) Notice: Subject to any disclaimer, the term of this patent is extended or adjusted under 35 U.S.C. 154(b) by 1237 days.

(21) Appl. No.: 14/746,924

(22) Filed: Jun. 23, 2015

(65) Prior Publication Data

US 2016/0379116 A1   Dec. 29, 2016

(51) Int. Cl.
*G06N 5/00* (2006.01)
*G06F 16/22* (2019.01)

(52) U.S. Cl.
CPC ......... *G06N 5/003* (2013.01); *G06F 16/2282* (2019.01)

(58) Field of Classification Search
CPC . G06F 17/30339; G06F 16/2282; G06N 5/02; G06N 5/003
See application file for complete search history.

(56) References Cited

U.S. PATENT DOCUMENTS

| | | | | |
|---|---|---|---|---|
| 5,799,299 A * | 8/1998 | Fujiwara | ........... | G06F 17/30985 |
| 6,421,664 B1 * | 7/2002 | Groeschel | ......... | G06F 16/24545 |
| 6,587,466 B1 * | 7/2003 | Bhattacharya | ...... | H04L 41/0893 370/395.21 |
| 8,806,143 B1 * | 8/2014 | Cheng | ................... | G06F 3/0611 707/799 |
| 2002/0156891 A1 * | 10/2002 | Ulrich | ............... | G06F 17/30067 709/225 |
| 2004/0111556 A1 * | 6/2004 | Torkelsson | ............. | G11C 15/00 711/108 |
| 2004/0172583 A1 * | 9/2004 | Amer | ................ | H03M 13/6505 714/792 |
| 2005/0125474 A1 * | 6/2005 | Pednault | ................. | G06F 17/18 708/400 |
| 2006/0106832 A1 * | 5/2006 | Ben-Dyke | ......... | G06F 17/30327 |
| 2007/0016498 A1 * | 1/2007 | Mott | ...................... | G06Q 40/00 705/35 |
| 2007/0299865 A1 * | 12/2007 | Nakano | ............. | G06F 17/30333 |
| 2008/0039190 A1 * | 2/2008 | Walker | ................ | G07F 17/3248 463/25 |
| 2010/0250540 A1 * | 9/2010 | Adda | ................ | G06F 17/30312 707/737 |
| 2012/0023082 A1 * | 1/2012 | Kotha | ............... | G06F 17/30625 707/706 |
| 2012/0288036 A1 * | 11/2012 | Panigrahy | ............... | H04L 27/06 375/340 |
| 2014/0282514 A1 * | 9/2014 | Carson | ................ | G06F 9/45533 718/1 |
| 2016/0188814 A1 * | 6/2016 | Raghavan | .............. | G16H 40/20 705/2 |

* cited by examiner

*Primary Examiner* — Alford W Kindred
*Assistant Examiner* — Tiffany Thuy Bui
(74) *Attorney, Agent, or Firm* — RowanTree Law Group, PLLC; Carson C. K. Fincham

(57) ABSTRACT

Systems, methods, and articles of manufacture provide for binary tree storage. Optimized or enhanced storage of binary trees may, for example, increase processing performance and reduce operational burdens on memory resources associated with execution of predictive models.

19 Claims, 11 Drawing Sheets

SYSTEMS AND METHODS FOR BINARY TREE STORAGE

BACKGROUND

Binary trees are useful data structures that are commonly utilized in various computer programming applications. Predictive modelling algorithms or programs, for example, are often particularly amenable to being represented or stored as binary trees. The more complex a predictive model, the deeper the "forest" of binary trees required to represent the model. As such "forests" must be loaded into memory and organized pursuant to model execution, tradeoffs in data storage requirements and execution times occur.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments presented herein are descriptive of systems, apparatus, methods, and articles of manufacture for storing binary trees. In some embodiments, binary tree data may be stored utilizing a plurality of arrays. According to some embodiments, for example, five (5) primitive arrays may store data as described herein to define the binary tree, which may provide various benefits such as decreased memory footprint and/or increased binary tree traversal speeds.

Figure 1:
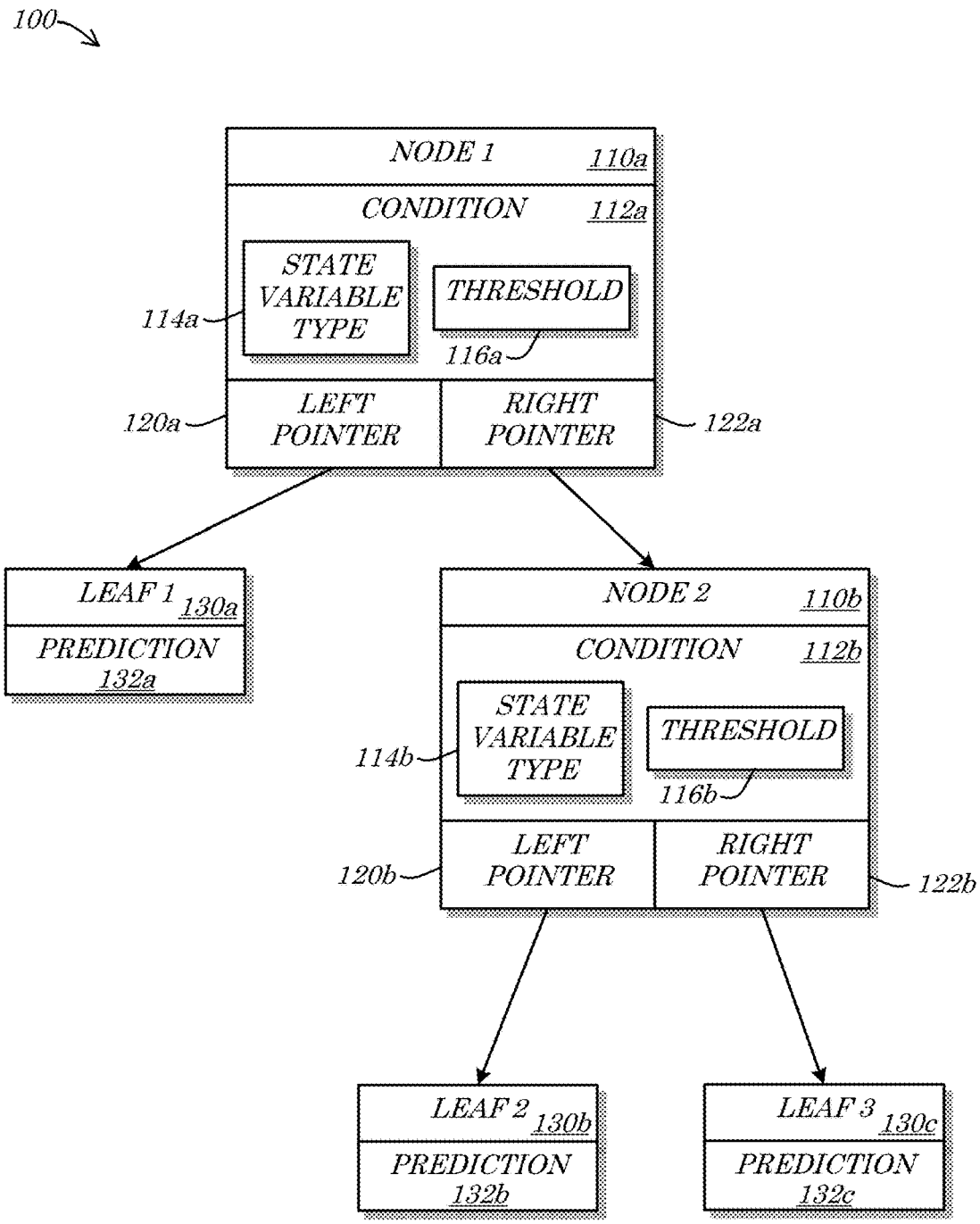
FIG. 1 is a block diagram of a binary tree.

For a better understanding of the differences between the binary tree storage techniques described herein with respect to typical binary tree storage, reference is first made to FIG. 1, in which a block diagram of a binary tree 100 (as is known in the art) is shown. The binary tree 100 may comprise, for example, a plurality of nodes 110a-b, each node 110a-b comprising a condition 112a-b. The conditions 112a-b are most typically defined in terms of the mathematical operator "less than or equal to". In some cases, such as shown in FIG. 1, the conditions 112a-b may comprise a state variable type 114a-b and/or a threshold 116a-b. Each node 110a-b also generally stores both a left pointer 120a-b and a right pointer 122a-b. The left pointer 120a-b points to a left child (e.g., which typically evaluates in the case that the condition 112a-b is true) and the right pointer 122a-b points to a right child (e.g., which typically evaluates in the case that the condition 112a-b is false). A first node ("Node 1") 110a is generally referred to as the root—i.e., a node 110a-b that is not the child of any other node 110a-b. Any element of the binary tree 100 that has no children is referred to as a leaf 130a-c (e.g., a "terminal node"). Each leaf 130a-c generally comprises a prediction 132a-c. In the case that the binary tree 100 is descriptive of or associated with a predictive model, the prediction 132a-c upon which traversal of the binary tree 100 resolves is considered the outcome or result of the predictive model. In accordance with the format of the binary tree 100, any predictive model based on such a data structure must resolve to a single result/outcome (e.g., a single one of the predictions 132a-c).

Figure 2:
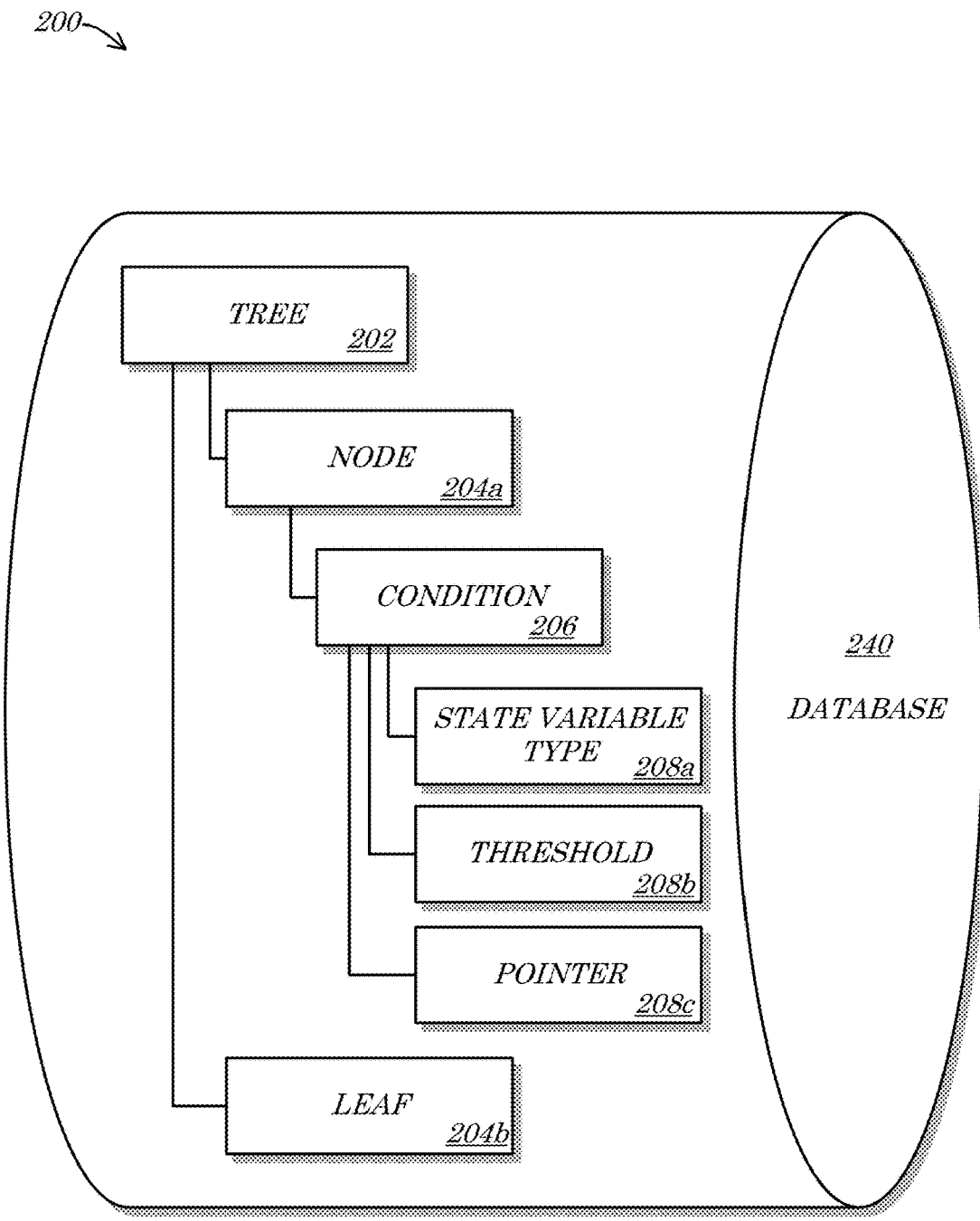
FIG. 2 is a block diagram of a system for storing a binary tree.

The binary tree 100 is typically stored, in Object Oriented Programming (OOP) languages, utilizing OOP "objects". As depicted in FIG. 2, for example, a system 200 may store a tree object 202 defining a binary tree (e.g., the binary tree 100 of FIG. 1) in terms of a node object 204a and a leaf object 204b. The node object 204a may further be defined in terms of a condition object 206. In some cases, the condition object 206 may further be defined in terms of a state variable object 208a, a threshold object 208b, and one or more pointer objects 208c (e.g., corresponding to left pointers 120a-b and right pointers 122a-b as shown in FIG. 1). Instances of these objects 202, 204a-b, 206, 208a-c may typically be stored in a database 240. The object oriented storage approach for binary trees is desirable as it provides an elegant and easily understood arrangement of the components of the binary tree.

The object oriented storage approach for binary trees may, however, pose disadvantages in certain scenarios. There may, for example, be significant memory overhead associated with creation of the many various objects 202, 204a-b, 206, 208a-c necessary to define a binary tree, particularly in instances where many simultaneously executed binary trees are utilized to execute a predictive model. Any particular execution of a certain predictive model (e.g., with respect to an account, member, and/or game player) may, for example, require traversal of multiple binary trees. Traversal of a binary tree requires processor and memory resources to perform calculations, access details of the binary tree, and decide upon actions. In the case that the certain predictive model is executed for multiple accounts/members/players, such multiple tree traversals may further need to be executed multiple times for each instance of the certain predictive model—which may occur in parallel, further taxing memory and processing resources. In the case that multiple predictive models of various types are executed for each account/member/player, the number of binary tree traversals may become quite large, greatly increasing the burden on computer resources in accordance with the system 200. Further, even in the case that instances of the various objects 202, 204a-b, 206, 208a-c are created consecutively, the physical memory space (e.g., in the database 240) assigned to the various instances is not necessarily likely to be contiguous. Accordingly, accessing the various instances may not allow for an efficient access and/or utilization of physical memory segments.

II. Optimized Binary Tree Data Storage

Neither the memory footprint required for OOP storage of binary trees nor the non-contiguous usage of physical memory segments that results from such a storage technique may be readily identified as problematic in many use cases of binary tree-based algorithms. Applicant has realized, however, that in some cases, these and/or other deficiencies of typical binary tree storage techniques may be problematic.

In the case of predictive models utilized to analyze historic data descriptive of activities or attributes of members (e.g., online gaming members and/or other account-based or member-based user-specific data sets), for example, predictions of unknown events may be made utilizing one or more of "Random Forest" or "Gradient Boosting" predictive model types. Random Forest models typically utilize a large number of wide binary trees with deep branches (e.g., five hundred (500) to one thousand (1000) trees, each with thousands of nodes) while Gradient Boosting models typically utilize a much larger number of small binary trees. In either case, however, the required data structures are large and accordingly involve relatively high levels of memory dedication. Traversing such large trees, or large numbers of trees, also requires significant processor resources.

Predictive models, for example, become more accurate and/or produce more statistically significant results in the case that they are based upon traversal of large numbers of trees, e.g., each tree having many and/or "deep" branches. Each result or "prediction" from a model is generally effectuated by a large number of decisions made in accordance with binary tree traversal. In the case that such predictive models are executed for a plurality of objects, items, actions, etc., the demand on memory and processing resources can become large. The amount of memory required to support such predictive models is increased in the case that any particular action or state (e.g., of a member) may be analyzed by traversing a number of binary trees associated with a number of predictive models, each directed to returning a result for a particular prediction. Even further so in the case that multiple questions and/or members are desired to be analyzed via predictive modelling simultaneously. Memory and/or processing taxation is magnified, for example, in the case that multiple predictive models (e.g., each directed to providing or determining a different prediction) are executed for each object, item, action, etc., simultaneously. Such predictive models may generally be utilized to return results for a variety of different predictions and/or for a variety of different reasons. Predictive models may be utilized, for example, to analyze data fro a variety of purposes such as, but not limited to, (i) Anti-Money Laundering (AML; e.g., to identify emergent patterns that are suggestive of money laundering activities), (ii) fraud detection (e.g., improper collusion), (iii) problem gambling detection (e.g., to identify patterns indicative of irresponsible gaming and/or gambling), (iv) "burnout" and/or lapse prevention (e.g., to identify patterns suggestive of a probability that a member will leave a particular website, account, game, etc.), (v) high-value member (e.g., Very Important Person (VIP) propensity (e.g., estimating likelihoods of a member/player becoming a high-value member/player), (vi) customized and/or personalized promotions (e.g., member profiling for targeted advertising and/or marketing expenditures), and/or (vii) intelligent contact timing (e.g., to predict the best method and/or time to attempt to engage in communications with a contact/member/player). While predictive models in the context of online wagering activities are utilized as examples herein, such models may also or alternatively be utilized to produce predictions for a wide variety of data analysis goals. In the case of online portals having thousands of online members (e.g., online game players with online gaming accounts and/or login credentials) undergoing state changes and/or triggering actions, for example, the number of deep tree traversals required greatly increases memory constraints, as well as execution times. This is particularly the case where analysis of such trees is desired in real-time or near real-time (e.g., real-time predictive model execution).

Applicant has further realized that predictive modelling, such as real-time (e.g., "live") or near real-time predictive modeling, can be significantly enhanced or optimized by storing binary trees in a different manner. To assist in explanation of the novel techniques for binary tree storage presented herein, reference is made to FIG. 3, in which an example binary tree 300 according to some embodiments is shown. The example binary tree 300 may, for example, be utilized by a predictive modelling procedure, algorithm, and/or module to determine whether or not (and/or to what extent) certain action(s) should be taken with respect to identified actions (or states) associated with a member's activities, such as the member's online gaming and/or wagering activities. The binary tree 300 may comprise, for example, a plurality of nodes 310*a-d*, 310*f-g*, 310*m* (labeled "Node A", "Node B", "Node C", "Node D", "Node F", "Node G", and "Node M", respectively), each node 310*a-d*, 310*f-g*, 310*m* comprising or defining a condition 312*a-d*, 312*f-g*, 312*m* (such as the depicted "less than or equal to" ("<=") mathematical operator), a state variable type 314*a-d*, 314*f-g*, 314*m*, a threshold 316*a-d*, 316*f-g*, 316*m*, a first pointer 320*a-d*, 320*f-g*, 320*m* (e.g., a "true" value pointer), and/or a second pointer 322*a-d*, 322*f-g*, 322*m*.

According to some embodiments, the state variable type 314*a-d*, 314*f-g*, 314*m* may be representative of various variables deemed to be pertinent to the predictive model(s) associated with the binary tree 300. In the case of online gaming and/or wagering member activities, for example, a first state variable type 314*a* may be descriptive of an amount of "drop" (e.g., a difference between an amount of money/currency a member wagers and an amount they win, over a particular period of time), a second state variable type 314*b* may be descriptive of an average amount of deposit, a third state variable type 314*c* may be descriptive of an average wager amount (e.g., for one or more particular time periods), a fourth state variable type 314*d* may be descriptive of an amount of "true drop" (e.g., a difference between an amount of money/currency a member wagers and an amount they win, minus any promotional funds awarded, over a particular period of time), a fifth state variable type 314*f* may be descriptive of a count of a number of wagers (e.g., over one or more particular time periods), a sixth state variable type 314*g* may be descriptive of an amount of withdrawal, and/or a seventh state variable type 314*m* may be descriptive of an amount of an ending balance, each associated with one or more particular members, players, types or categories of players, and/or predefined groups of players or members (e.g., "friends" or teams).

In some embodiments, the binary tree 300 may comprise a plurality of leaves 330*e*, 330*h-l*, 330*n-o* (labeled "Leaf E", "Leaf H", "Leaf I", "Leaf J", "Leaf K", "Leaf L", "Leaf N", and "Leaf O", respectively). The leaves 330*e*, 330*h-l*, 330*n-o* may each generally define a prediction 332*e*, 332*h-l*, 332*n-o*.

Figure 3:
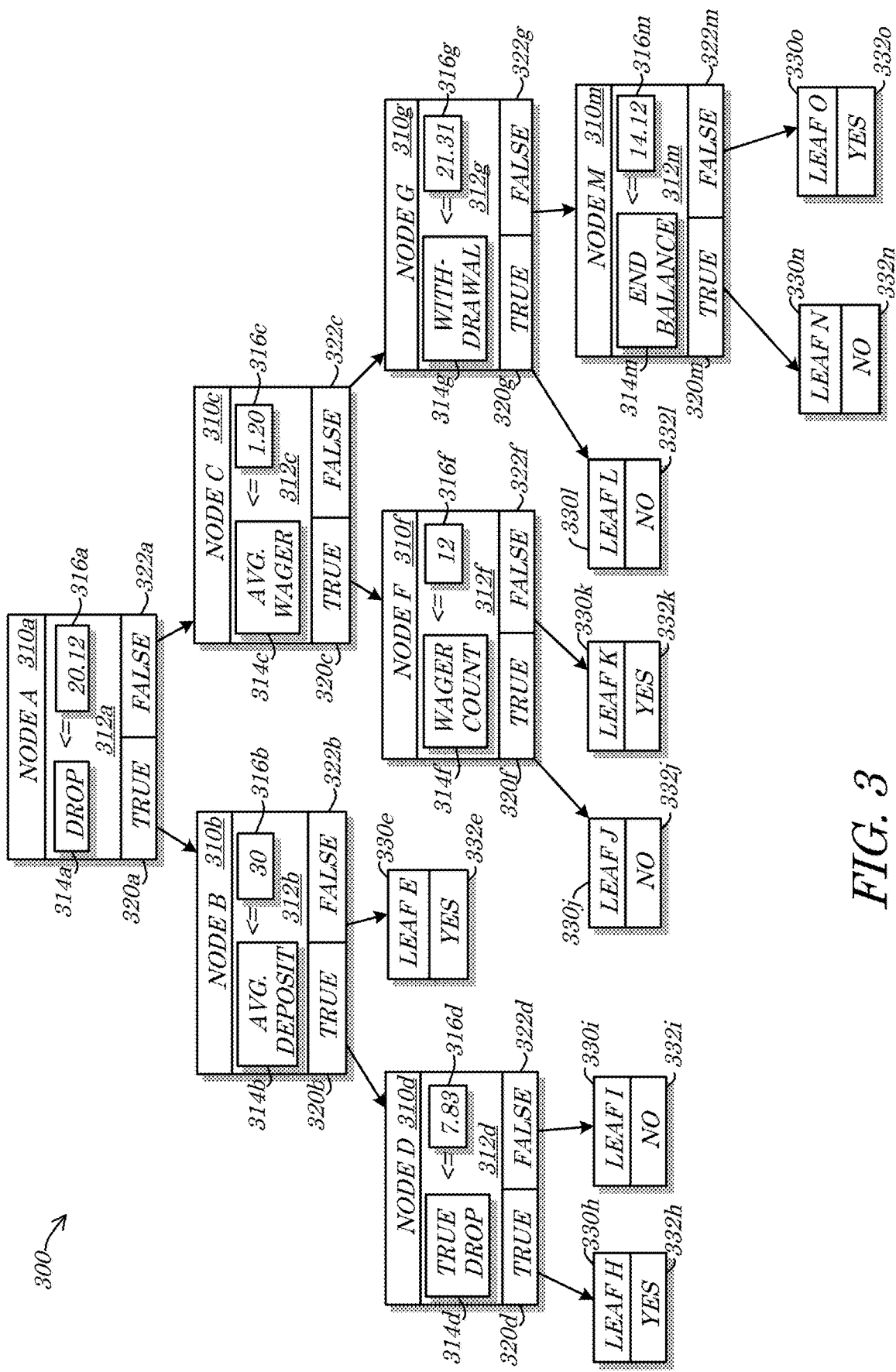
FIG. 3 is a block diagram of a binary tree according to some embodiments.

For illustrative purposes only, the number of nodes 310*a-d*, 310*f-g*, 310*m* in the binary tree 300 may be referred to as the variable "N", which in the case of the example binary tree 300 of FIG. 3 equates to seven (7). Also solely for illustrative purposes, the number of total components of the binary tree 300, which comprises the number of leaves 330*e*, 330*h-l*, 330*n-o* in the binary tree 300 plus the number of nodes 310*a-d*, 310*f-g*, 310*m* in the binary tree 300, may be referred to as the variable "M", which in the case of the example binary tree 300 of FIG. 3 equates to fifteen (15).

Applicant has realized that the example binary tree 300 of FIG. 3 (and other binary trees not shown, of course) may be stored in a compact manner (with respect to the typical OOP storage techniques) that also permits efficient traversal. Thus, by utilizing or employing such a novel technique available memory resources may be utilized more efficiently and/or fewer such resources may be required to execute predictive models. Further, eliminating the need to follow chains of memory pointers through the new technique may result in fewer memory access calls and accordingly may provide for faster process execution times.

Figure 4A:
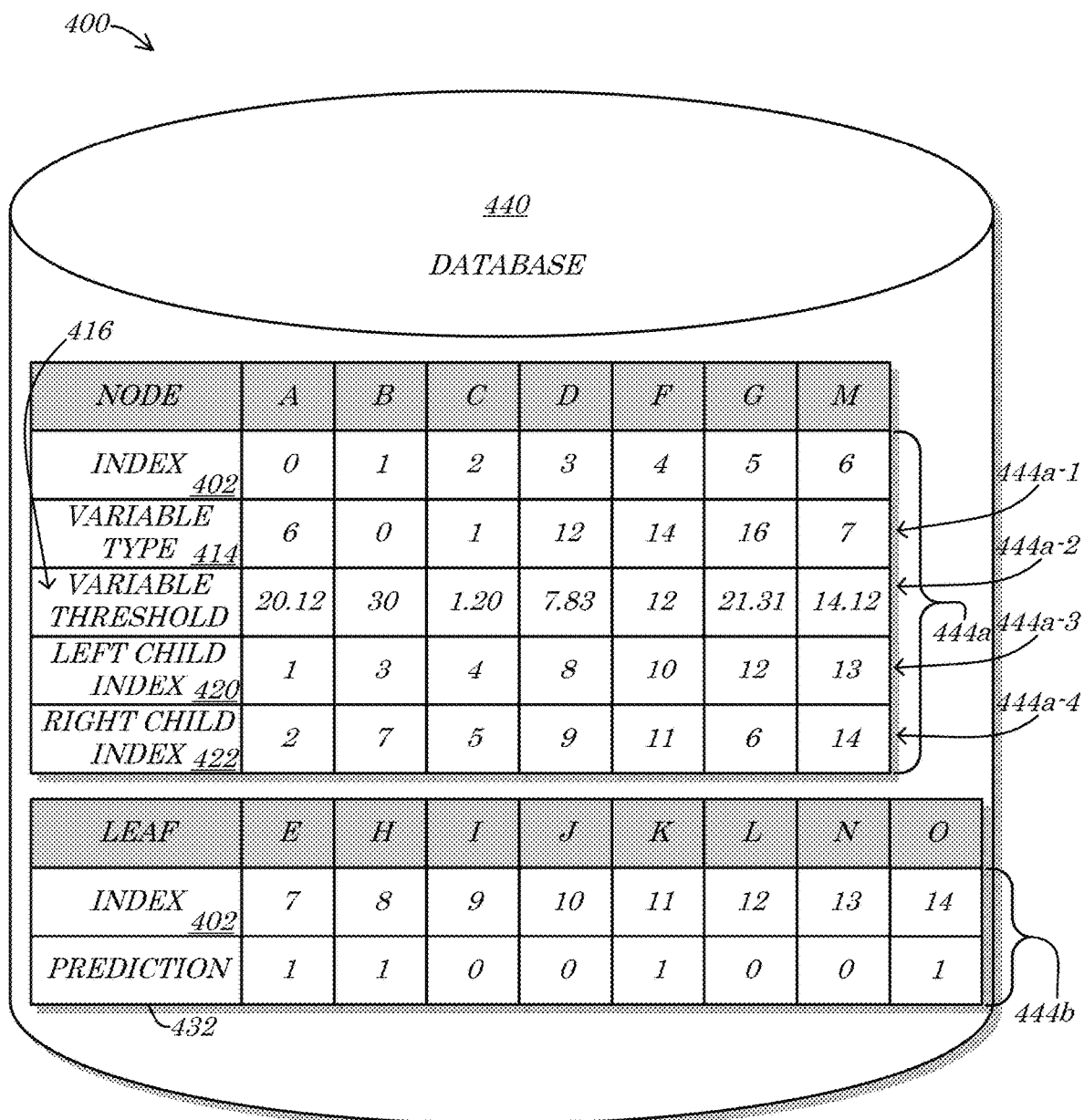
FIG. 4A and FIG. 4B are block diagrams of a system for storing a binary tree according to some embodiments.
Figure 4B:
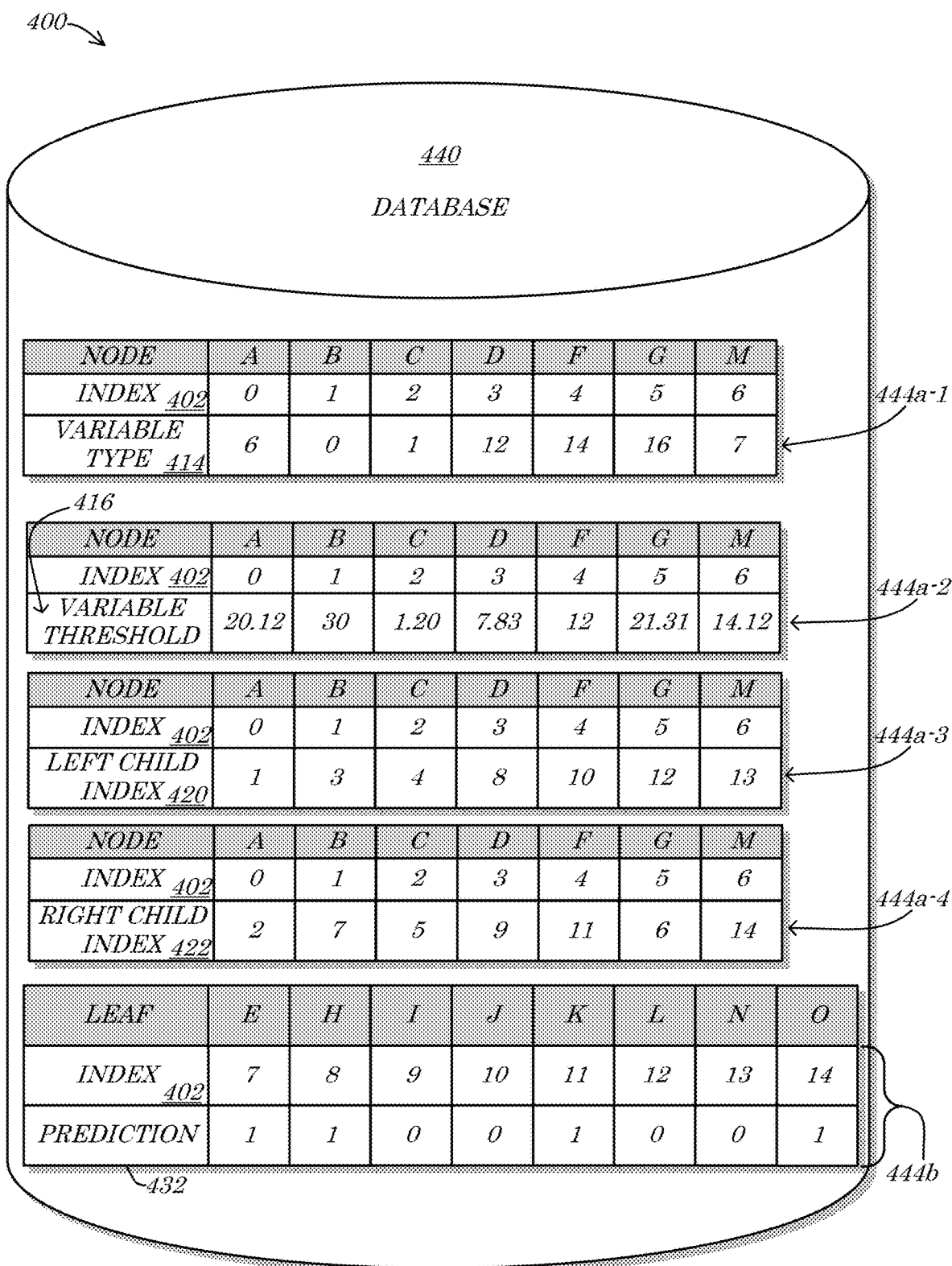

Turning to FIG. 4A and FIG. 4B, for example, block diagrams of a system 400 for storing a binary tree according to some embodiments are shown. As depicted, a plurality of logical index values 402, variable type values 414, variable threshold values 416, left child index values 420, right child index values 422, and/or prediction values 432 may be stored in a database 440 in a plurality of arrays 444a-b. According to some embodiments, the logical index values 402 may not be stored, but instead may be implicitly mapped to the physical indices of the arrays 444a-b. In some embodiments, a first array 444a may be utilized to store sequential and/or unique logical index values 402 for each of the nodes of a binary tree (e.g., for each of the nodes 310a-d, 310f-g, 310m in the binary tree 300 of FIG. 3) as well as one or more of the variable type values 414, variable threshold values 416, left child index values 420, and/or right child index values 422 for each such node. According to some embodiments, a second array 444b may be utilized to store sequential and/or unique logical index values 402 for each of the leaves of a binary tree (e.g., for each of the leaves 330e, 330h-l, 330n-o in the binary tree 300 of FIG. 3) as well as the prediction values 432 for each such leaf.

In some embodiments (such as noted in FIG. 4A and explicitly depicted in FIG. 4B), the first array 444a may comprise and/or be alternatively structured as four (4) separate arrays 444a-1, 444a-2, 444a-3, 444a-4, one for each of the variable type values 414, variable threshold values 416, left child index values 420, and right child index values 422.

According to some embodiments, the binary tree storage structure stored in the database 440 may, instead of utilizing typical OOP object-based storage structures and techniques, deconstruct the binary tree into the depicted plurality of arrays 444a-b (or 444a-1, 444a-2, 444a-3, 444a-4, and 444b). In some embodiments, the arrays may comprise primitive arrays.

In some embodiments, as depicted, each node and leaf may be assigned unique (at least with respect to any particular binary tree) logical index values 402. The root node may be assigned a logical index value 402 of zero (0), for example, with each remaining node being assigned a consecutive integer logical index value 402, up to the total number of nodes in the tree, "n" (in the example of FIG. 4A and FIG. 4B, "n"=six (6)). According to some embodiments, each leaf may be assigned a consecutive logical index value 402 starting at "n"+1 and proceeding to the number of total components (nodes and leaves) in the binary tree, "m" (in the example of FIG. 4A and FIG. 4B, "n"+1=seven (7) and "m"=fourteen (14)). In some embodiments, the logical index values 402 may be stored as "int" primitive variable types.

According to some embodiments, the variable type values 414 may be stored as "int" primitive variable types, the variable threshold values 416 may be stored as "double" primitive variable types, the left child index values 420 and/or the right child index values 422 may be stored as "int" primitive variable types, and/or the prediction values 432 may be stored as "double" primitive variable types. Thus, in the case where the first array 444a comprises the four (4) separate arrays 444a-1, 444a-2, 444a-3, 444a-4 and the second array 444b comprise a single array structure, a binary tree may be stored in the database 440 as a set of five (5) primitive arrays 444a-1, 444a-2, 444a-3, 444a-4, and 444b. In some embodiments, a first one of the four (4) separate arrays 444a-1 may comprise an array of "int" variables, a second one of the four (4) separate arrays 444a-2 may comprise an array of "double" variables, a third one of the four (4) separate arrays 444a-3 may comprise an array of "int" variables, and/or a fourth one of the four (4) separate arrays 444a-4 may comprise an array of "int" variables. According to some embodiments, the second array 444b may comprise an array of "double" variables.

In some embodiments, the variable type values 414 may be stored as numeric codes representing state variables utilized in the binary tree. As depicted, for example, the variable type values 414 may be represented by zero (0) for an average deposit amount, one (1) for an average wager amount, six (6) for a drop amount, seven (7) for an end balance amount, twelve (12) for a true drop amount, fourteen (14) for a wager count, and/or sixteen (16) for a total amount withdrawn. Fewer, more, and/or differing numeric (e.g., "int") mappings may be utilized as is or becomes desirable and/or practicable.

III. Processes

Figure 5:
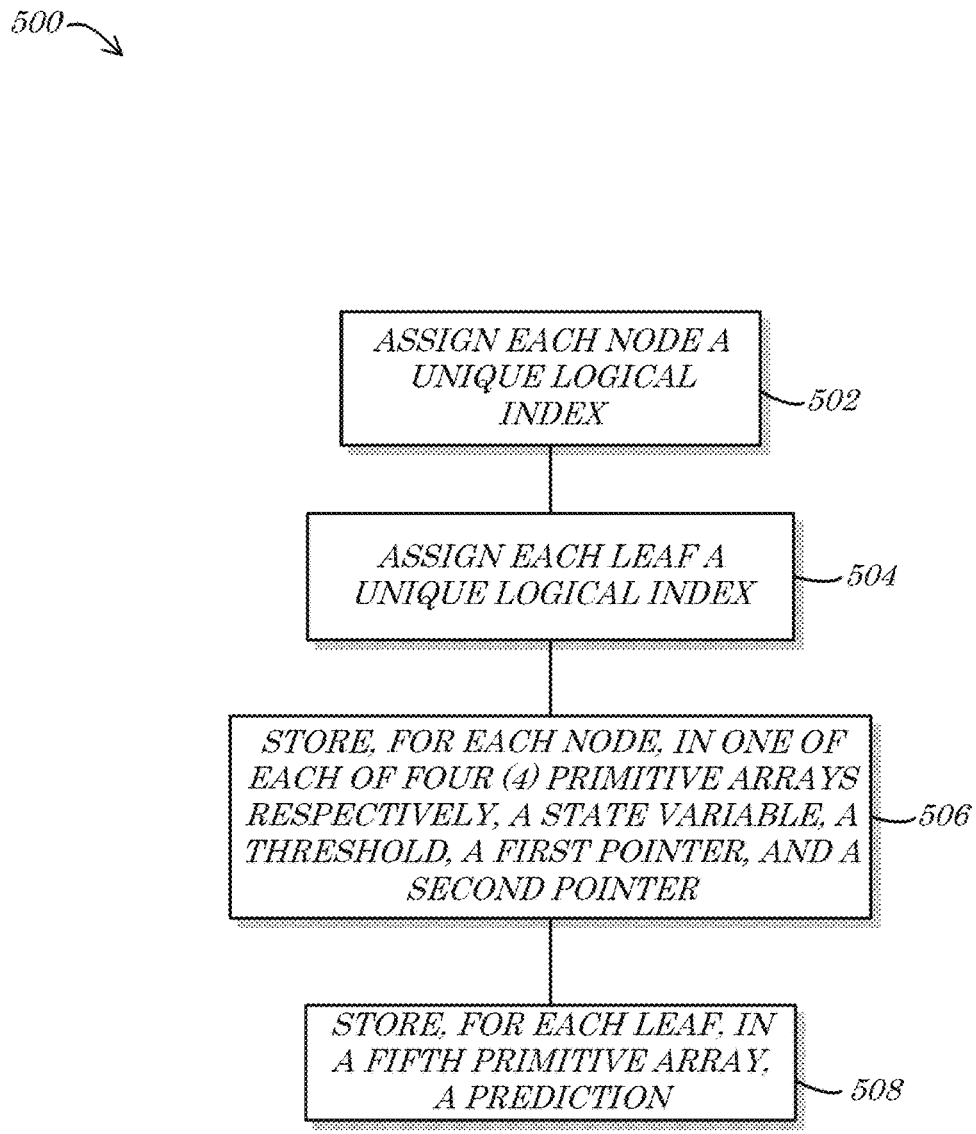
FIG. 5 is a flow diagram of a method according to some embodiments.

Referring now to FIG. 5, a flow diagram of a method 500 according to some embodiments is shown. In some embodiments, the method 500 may be performed and/or implemented by and/or otherwise associated with one or more specialized and/or computerized processing devices (e.g., the player and/or user devices 602a-n and/or the servers and/or controller devices 610, 710 of FIG. 6 and/or FIG. 7 herein), specialized computers, computer terminals, computer servers, computer systems and/or networks, and/or any combinations thereof (e.g., by one or more online gaming company and/or online gaming player processing devices). In some embodiments, the method 500 may be embodied in, facilitated by, and/or otherwise associated with various input mechanisms and/or interfaces. In some embodiments, the method 500 may be implemented in conjunction and/or association with execution of one or more predictive models that utilize binary tree data structures, e.g., as described herein.

The process and/or flow diagrams described herein do not necessarily imply a fixed order to any depicted actions, steps, and/or procedures, and embodiments may generally be performed in any order that is practicable unless otherwise and specifically noted. While generally not limiting with respect to order and/or timing, in some embodiments, the presented methods and processes may be specifically limited to and/or structured in accordance with any depicted and/or described order, hierarchy, timing, etc. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video/Versatile Disk (DVD)) may store thereon instructions that when executed by a machine (such as a computerized processing device) result in performance according to any one or more of the embodiments described herein.

In some embodiments, the method 500 may comprise assigning (e.g., by a central server device and/or specially-programmed processing device) a logical index to each node of a binary tree, at 502. A minimum logical index (and/or value thereof) may be assigned to a root node of the binary tree, for example, with each consecutive node being assigned a consecutive logical index (and/or value). According to some embodiments, the logical index values may be unique—e.g., at least with respect to the particular binary tree being processed/stored. In some embodiments, such as shown in the example binary tree 300 of FIG. 3 and/or the example database 440 of FIG. 4, the root node may be assigned a logical index of zero (0), with each consecutive node being assigned an incremental integer, through the total number of nodes in the binary tree, "n" (e.g., seven (7) in the example). In some embodiments, the assigning may comprise a determining of the logical indices and/or values thereof and/or may comprise a storing of the logical indices and/or values, e.g., in association with one or more arrays.

According to some embodiments, the method 500 may comprise assigning (e.g., by the central server device and/or specially-programmed processing device) a logical index to each leaf of the binary tree, at 504. A first leaf of the binary tree may be assigned a logical index and/or value starting immediately after the last value assigned to any node, for example, with each consecutive leaf being assigned a consecutive logical index (and/or value) incremented thereafter. According to some embodiments, the logical index values may be unique—e.g., at least with respect to the particular binary tree being processed/stored. In some embodiments, such as shown in the example binary tree 300 of FIG. 3 and/or the example database 440 of FIG. 4A and/or FIG. 4B, the first leaf may be assigned a logical index of "n"+1 (e.g., eight (8) in the example), with each consecutive leaf being assigned an incremental integer, through the total number of components (nodes and leaves) in the binary tree, "m" (e.g., fourteen (14) in the example). In some embodiments, the assigning may comprise a determining of the logical indices and/or values thereof and/or may comprise a storing of the logical indices and/or values, e.g., in association with one or more arrays.

In some embodiments, the method 500 may comprise storing (e.g., by the central server device and/or specially-programmed processing device) data for each node of the binary tree in at least one first array, at 506. Each node may, for example, be represented by a condition and/or a pointer, data descriptive of either or each of which may be stored in the at least one first array. As shown in with respect to the example binary tree 300 of FIG. 3 and/or the example database 440 of FIG. 4A and/or FIG. 4B, the condition may comprise and/or be defined by a state variable type and/or a threshold, and/or the pointer may comprise a plurality of pointers such as a first pointer storing a logical index of a first (e.g., left) child and/or a second pointer storing a logical index of a second (e.g., right) child. In some embodiments, the data stored for each node may be stored in a plurality of arrays such as primitive arrays. The first array may comprise or be replaced by, for example, a first one of four (4) arrays storing the state variable type, a second one of four (4) arrays storing the threshold, a third one of four (4) arrays storing the first pointer, and/or a fourth one of four (4) arrays storing the second pointer. In some embodiments, such data may be stored, respectively, as an "int" data type, a "double" data type, an "int" data type, and an "int" data type. The four (4) arrays may thus, in some embodiments, comprise primitive "int", "double", "int", and "int" arrays, respectively. According to some embodiments, the method 500 and/or the storing at 506 may also or alternatively comprise combining the last two (2) of the four (4) arrays (e.g., the arrays storing the first and second pointer data) into a two-dimensional matrix.

According to some embodiments, the method 500 may comprise storing (e.g., by the central server device and/or specially-programmed processing device) data for each leaf of the binary tree in at least one second array, at 508. The at least one second array may, for example, store a value for the prediction associated with each leaf. In some embodiments, the at least one second array may comprise a "double" array and/or may comprise a primitive array.

In some embodiments, the method 500 may comprise a method of deconstructing a binary tree into a plurality of arrays as described herein. An existing binary tree stored in OOP objects (and/or other objects such as comma-delimited files) may, for example, be processed by the method 500 (or a portion thereof) to convert the binary tree storage to the format and structure defined herein. According to some embodiments, a newly-defined binary tree may be directly saved and/or defined utilizing the arrays and/or methods of storing data in the arrays as described herein. In some embodiments, once the binary tree is stored or constructed in the multiple array format, the binary tree may be traversed.

According to some embodiments, storing a binary tree as described in relation to FIG. 4A, FIG. 4B, and/or FIG. 5 may promote the realization of various benefits as described herein (e.g., particularly with respect to standard OOP object-based binary tree storage). Preliminary testing has shown, for example, that the specialized array-based binary tree storage techniques (and structures) described herein may reduce the required memory footprint of a binary tree saved via OOP object-based storage techniques (e.g., approximately two gigabytes (2 GB), for example) by about five (5) times (e.g., reduced down to approximately four hundred megabytes (400 MB)). Further, in some embodiments, the novel array-based binary tree storage described herein may provide performance (e.g., traversal and/or predictive modeling performance) enhancement. Contiguous allocation of data elements requiring reads stored in array format, for example, may generally require fewer read transactions than OOP object-based storage reads for the same process, where the physical memory utilized is not likely contiguous. Applicant further believes that were the systems and methods herein applied to "complete" binary trees, even further levels of compaction and/or performance enhancement may be achieved. Complete binary trees may not require the arrays (e.g., the last two (2) of the four (4) node data arrays) storing the left and right (or first and second) pointer data, for example, as such data may be inferred from the inherent structure of the complete binary tree.

IV. Systems

Figure 6:
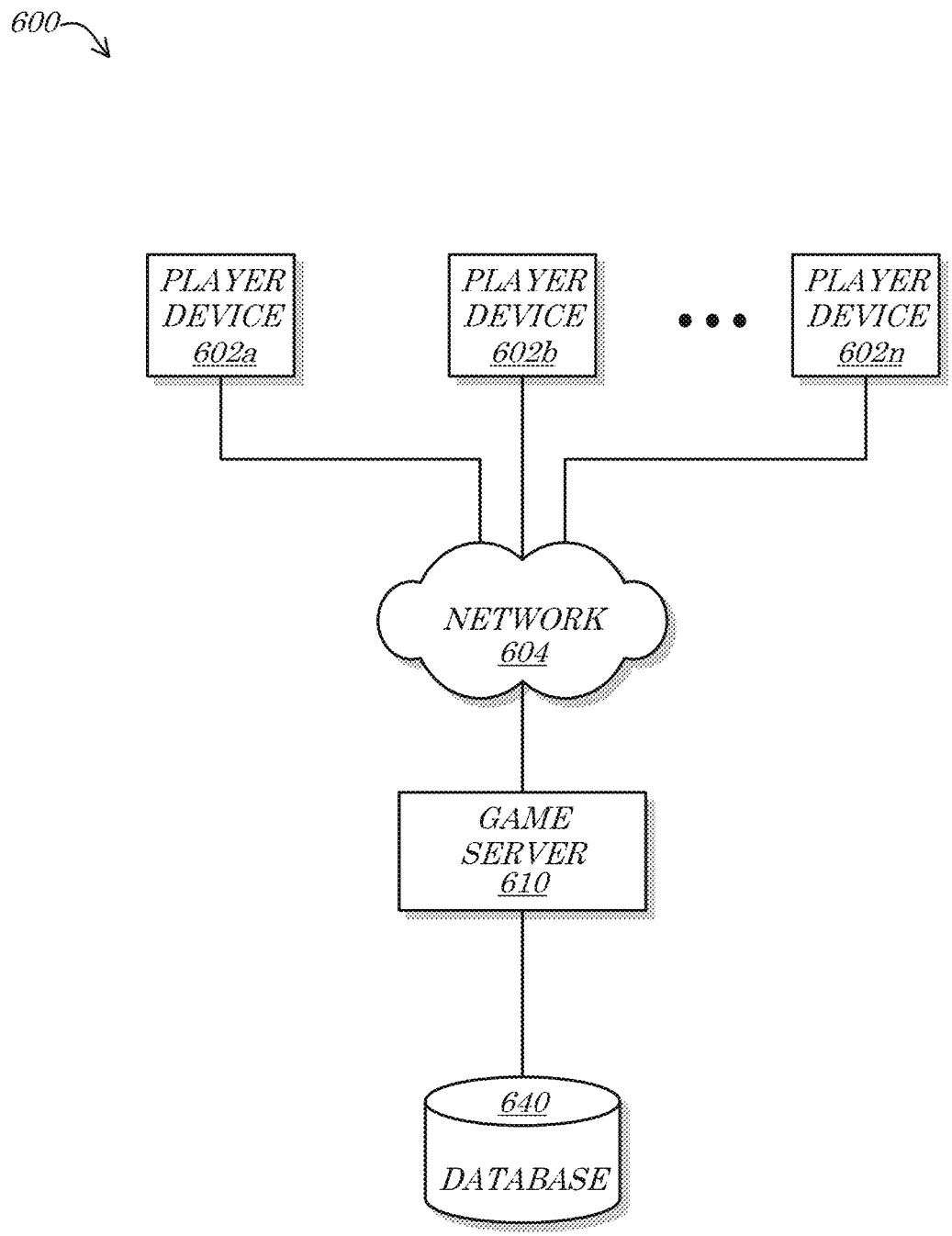
FIG. 6 is a block diagram of a system according to some embodiments.

Referring now to FIG. 6, a block diagram of a system 600 according to some embodiments is shown. In some embodiments, the system 600 may comprise a gaming platform such as a gaming platform via which one or more multi-player and/or online games may be played. In some embodiments, the system 600 may comprise a plurality of player devices 602*a-n* in communication with and/or via a network 604. In some embodiments, a game server 610 may be in communication with the network 604 and/or one or more of the player devices 602*a-n*. In some embodiments, the game server 610 (and/or the player devices 602*a-n*) may be in communication with a database 640. The database 640 may store, for example, game data (e.g., processed and/or defined by the game server 610), data associated with players (not explicitly shown) owning and/or operating the player devices 602a-n, and/or instructions that cause various devices (e.g., the game server 610 and/or the player devices 102a-n) to operate in accordance with embodiments described herein. The database 640 may store, for example, one or more binary trees in an array-based format as described herein and/or may permit traversal of the binary tree via access to the arrays, such as to permit the game server 610 to perform and/or execute one or more predictive models or other binary tree-based algorithms (e.g., in a manner requiring less data storage space and/or having increased execution speeds compared to typical systems). In some embodiments, the database 640 may also or alternatively comprise one or more different memory types such as application operational memory (e.g., RAM or cache) utilized to execute predictive models as described herein.

According to some embodiments, any or all of the components 602a-n, 604, 610, 640 of the system 600 may be similar in configuration and/or functionality to any similarly named and/or numbered components described herein. Fewer or more components 602a-n, 604, 610, 640 (and/or portions thereof) and/or various configurations of the components 602a-n, 604, 610, 640 may be included in the system 600 without deviating from the scope of embodiments described herein. While multiple instances of some components 602a-n are depicted and while single instances of other components 604, 610, 640 are depicted, for example, any component 602a-n, 604, 610, 640 depicted in the system 600 may comprise a single device, a combination of devices and/or components 602a-n, 604, 610, 640, and/or a plurality of devices, as is or becomes desirable and/or practicable. Similarly, in some embodiments, one or more of the various components 602a-n, 604, 610, 640 may not be needed and/or desired in the system 600.

The player devices 602a-n, in some embodiments, may comprise any type or configuration of electronic, mobile electronic, and or other network and/or communication devices (or combinations thereof) that are or become known or practicable. A first player device 602a may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 602a-n may be specifically utilized and/or configured (e.g., via specially-programmed and/or stored instructions such as may define or comprise a software application) to communicate with the game server 610 (e.g., via the network 604).

The network 604 may, according to some embodiments, comprise a LAN, WAN, cellular telephone network, Bluetooth® network, NFC network, and/or RF network with communication links between the player devices 602a-n, the game server 610, and/or the database 640. In some embodiments, the network 604 may comprise direct communications links between any or all of the components 602a-n, 610, 640 of the system 600. The game server 610 may, for example, be directly interfaced or connected to the database 640 via one or more wires, cables, wireless links, and/or other network components, such network components (e.g., communication links) comprising portions of the network 604. In some embodiments, the network 604 may comprise one or many other links or network components other than those depicted in FIG. 6. A second player device 602b may, for example, be connected to the game server 610 via various cell towers, routers, repeaters, ports, switches, and/or other network components that comprise the Internet and/or a cellular telephone (and/or Public Switched Telephone Network (PSTN)) network, and which comprise portions of the network 604.

While the network 604 is depicted in FIG. 6 as a single object, the network 604 may comprise any number, type, and/or configuration of networks that is or becomes known or practicable. According to some embodiments, the network 604 may comprise a conglomeration of different sub-networks and/or network components interconnected, directly or indirectly, by the components 602a-n, 610, 640 of the system 600. The network 604 may comprise one or more cellular telephone networks with communication links between the player devices 602a-n and the game server 610, for example, and/or may comprise the Internet, with communication links between the player devices 602a-n and the database 640, for example.

According to some embodiments, the game server 610 may comprise a device (and/or system) owned and/or operated by or on behalf of or for the benefit of a gaming entity (not explicitly shown). The gaming entity may utilize player and/or game information or instructions (e.g., stored by the database 640), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 6) to and/or via the player devices 602a-n. The interface may be configured, according to some embodiments, to allow and/or facilitate electronic game play by one or more players. In some embodiments, the system 600 (and/or interface provided by the game server 610) may present game data (e.g., from the database 640) in such a manner that allows players to participate in one or more online games (singularly, in/with groups, and/or otherwise). According to some embodiments, the game server 610 may execute and/or facilitate one or predictive model processes by accessing binary tree data stored in accordance with the array-based techniques and/or structures described herein.

In some embodiments, the database 640 may comprise any type, configuration, and/or quantity of data storage devices that are or become known or practicable. The database 640 may, for example, comprise an array of optical and/or solid-state hard drives configured to store player and/or game data (e.g., player and/or member state and/or trigger data), and/or various operating instructions, drivers, predictive modelling algorithms and/or modules, arrays defining binary trees, etc. While the database 640 is depicted as a stand-alone component of the system 600 in FIG. 6, the database 640 may comprise multiple components. In some embodiments, a multi-component database 640 may be distributed across various devices and/or may comprise remotely dispersed components. Any or all of the player devices 602a-n may comprise the database 640 or a portion thereof, for example, and/or the game server 610 may comprise the database 640 or a portion thereof.

V. Apparatus and Articles of Manufacture

Figure 7:
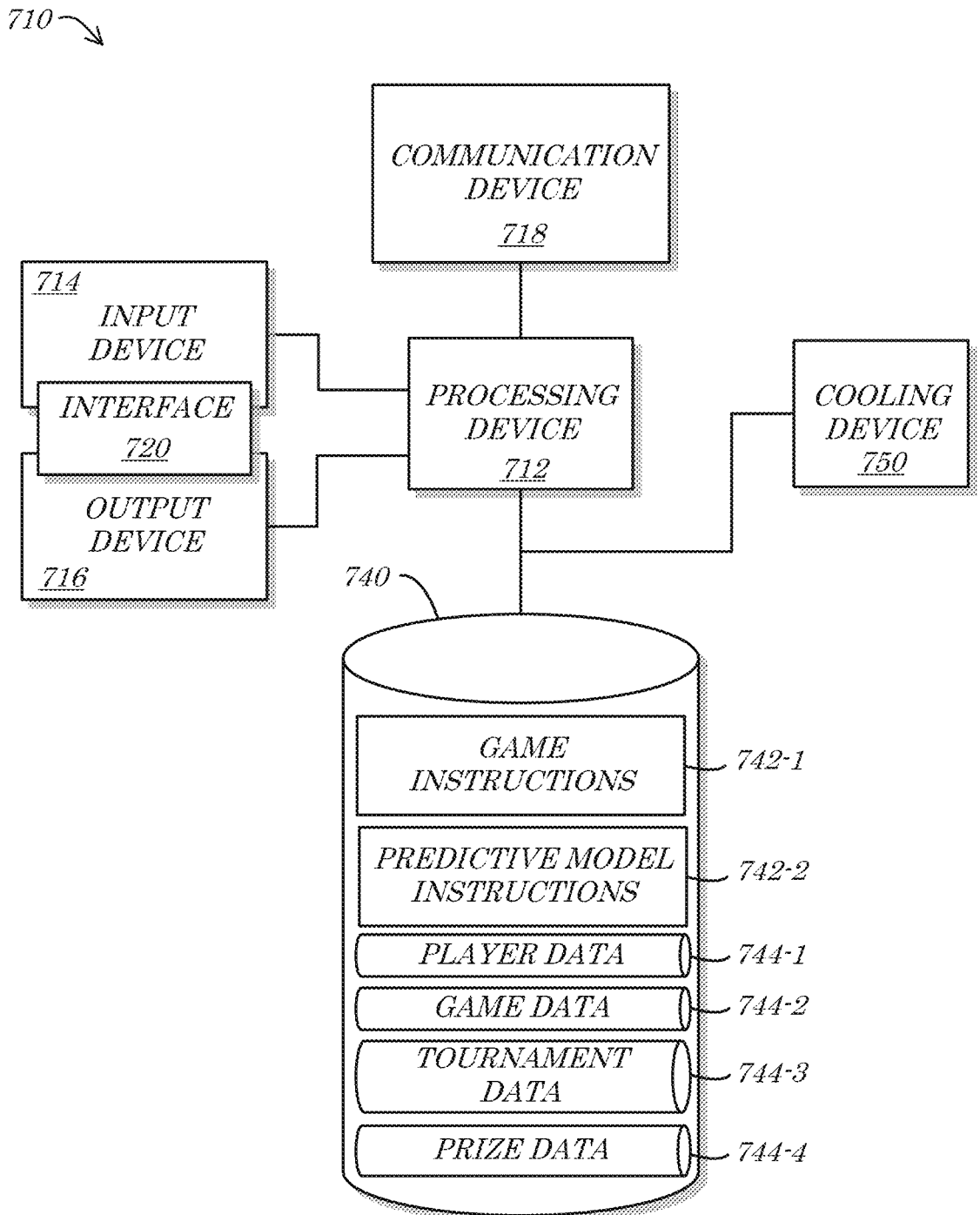
FIG. 7 is a block diagram of an apparatus according to some embodiments.
Figure 8A:
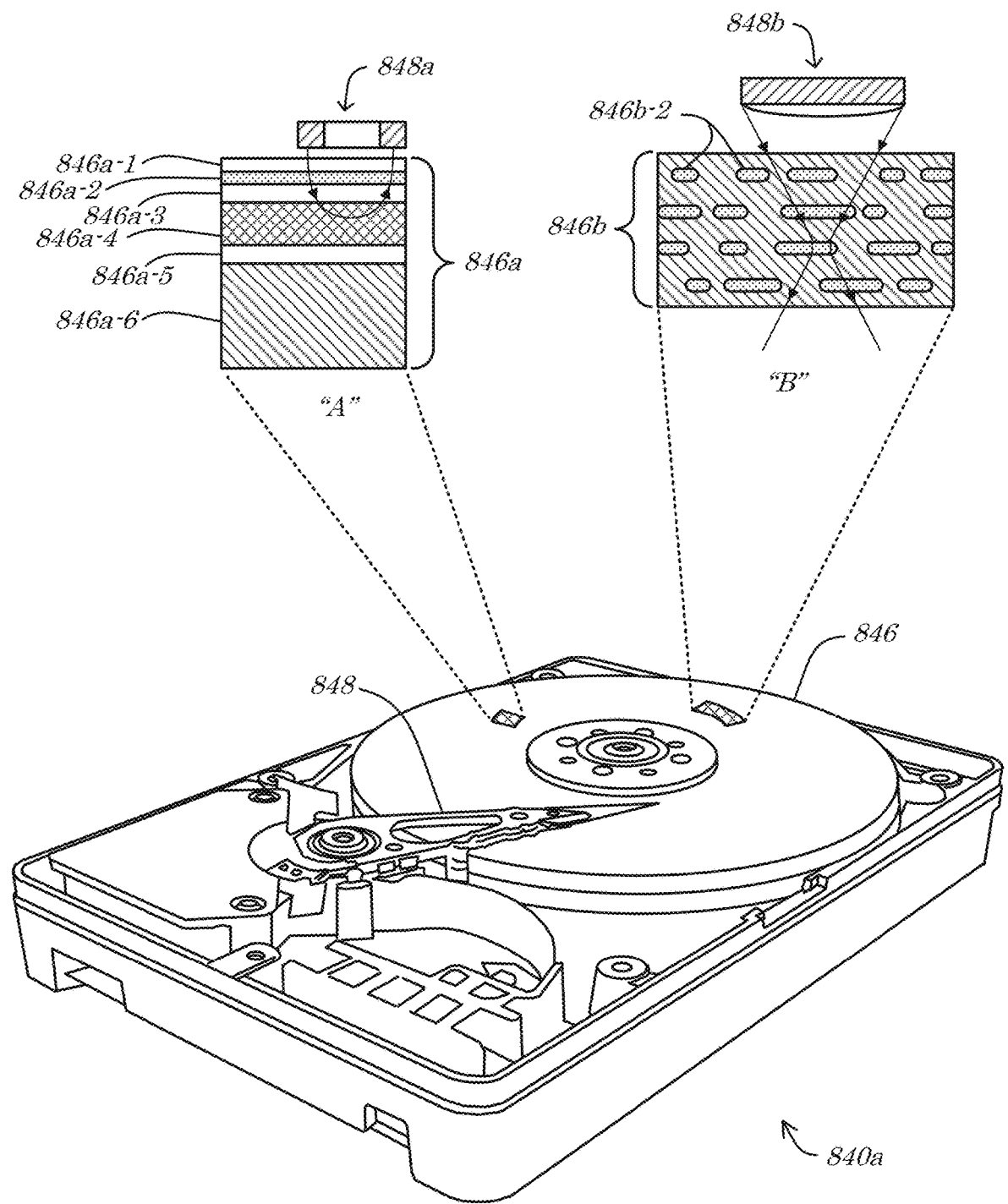
FIG. 8A, FIG. 8B, FIG. 8C, FIG. 8D, and FIG. 8E are perspective diagrams of exemplary data storage devices according to some embodiments.
Figure 8B:
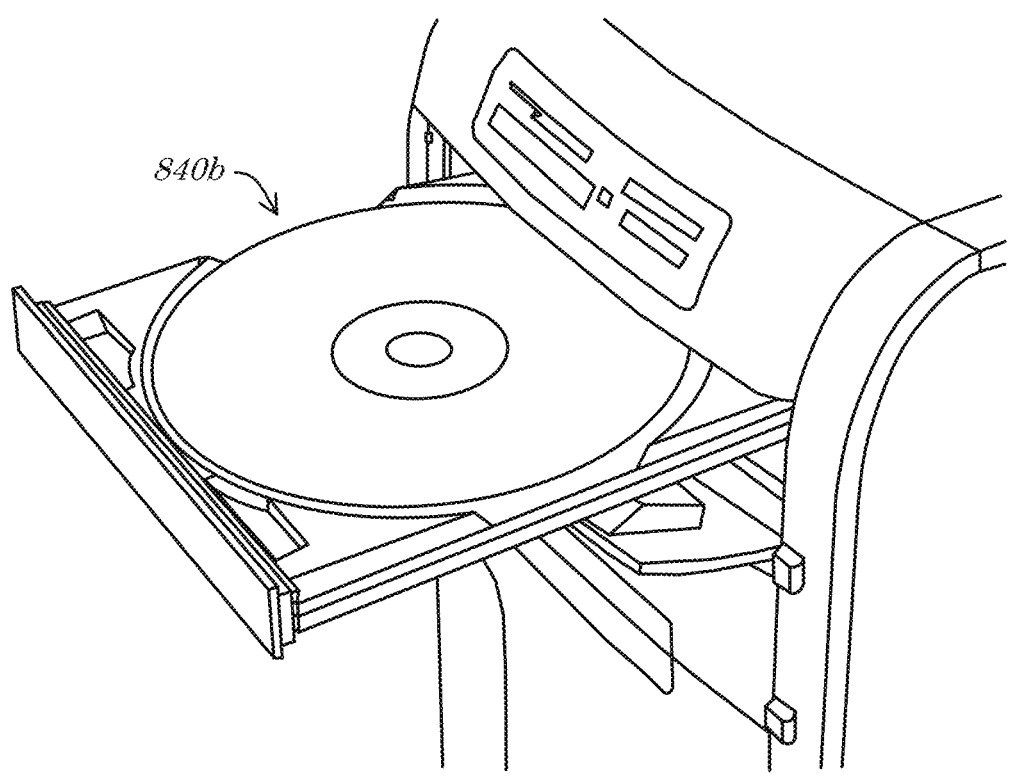
Figure 8C:
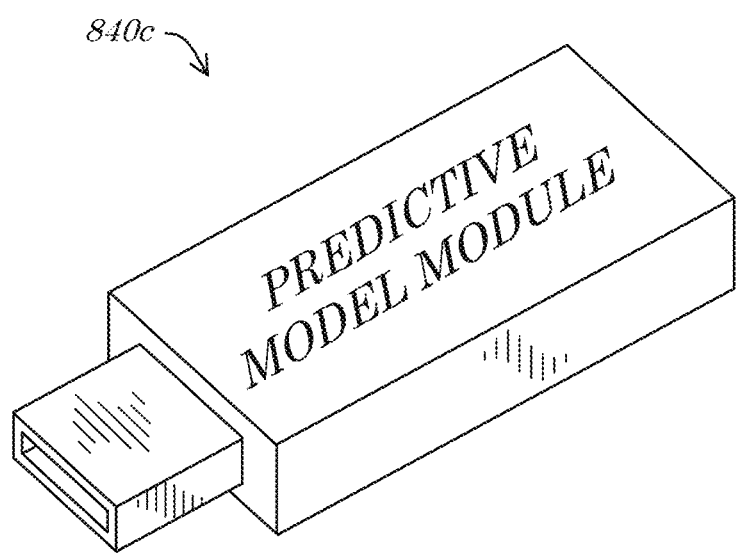
Figure 8D:
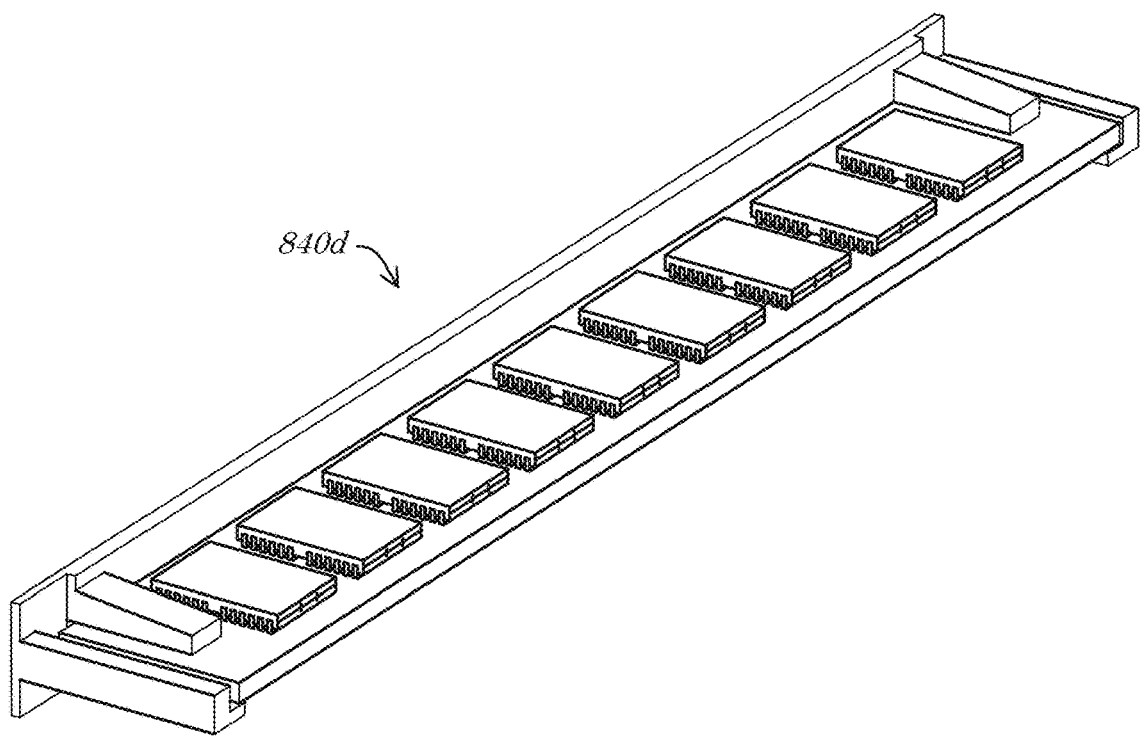
Figure 8E:
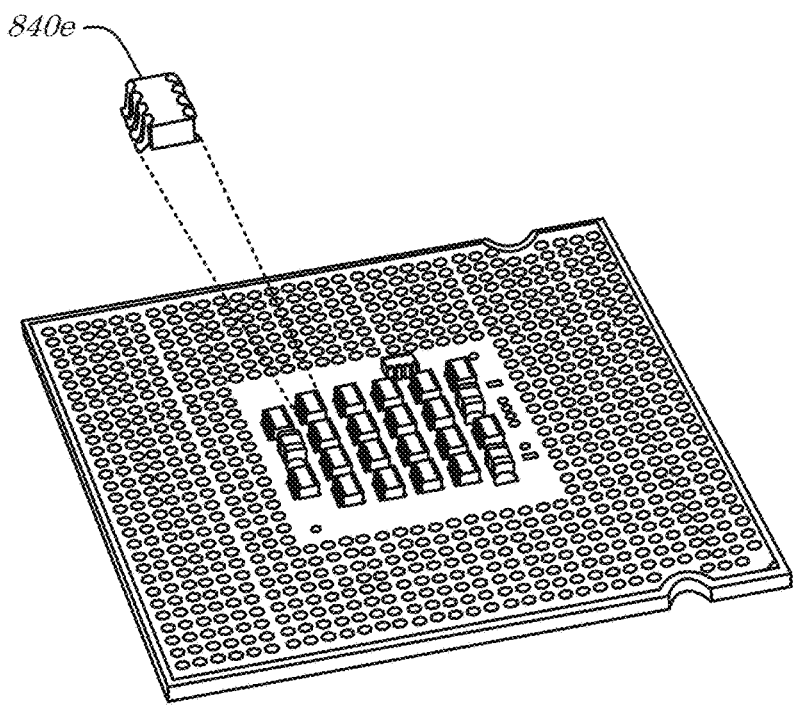

Turning to FIG. 7, a block diagram of an apparatus 710 according to some embodiments is shown. In some embodiments, the apparatus 710 may be similar in configuration and/or functionality to any of the player and/or user devices 602*a-n* and/or the servers 610 of FIG. 6 herein, and/or may otherwise comprise a portion of the system 600 of FIG. 6 herein. The apparatus 710 may, for example, execute, process, facilitate, and/or otherwise be associated with the method 500 described in conjunction with FIG. 5 herein, and/or one or more portions thereof. In some embodiments, the apparatus 710 may comprise a processing device 712, an input device 714, an output device 716, a communication device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 be included in the apparatus 710 without deviating from the scope of embodiments described herein.

According to some embodiments, the processing device 712 may be or include any type, quantity, and/or configuration of electronic and/or computerized processor that is or becomes known. The processing device 712 may comprise, for example, an Intel® IXP 2800 network processor or an Intel® XEON™ Processor coupled with an Intel® E7501 chipset. In some embodiments, the processing device 712 may comprise multiple inter-connected processors, microprocessors, and/or micro-engines. According to some embodiments, the processing device 712 (and/or the apparatus 710 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 710 comprises a server such as a blade server, necessary power may be supplied via a standard AC outlet, power strip, surge protector, a PDU, and/or Uninterruptible Power Supply (UPS) device (none of which are explicitly shown).

In some embodiments, the input device 714 and/or the output device 716 are communicatively coupled to the processing device 712 (e.g., via wired and/or wireless connections and/or pathways) and they may generally comprise any types or configurations of input and output components and/or devices that are or become known, respectively. The input device 714 may comprise, for example, a keyboard that allows an operator of the apparatus 710 to interface with the apparatus 710 (e.g., by a player, such as to participate in an online game session and/or by a user executing one or more predictive models based on binary trees stored in array-based formats, as described herein). The output device 716 may, according to some embodiments, comprise a display screen and/or other practicable output component and/or device. The output device 716 may, for example, provide a game interface such as the interface 720 to a player (e.g., via a website). In some embodiments, the interface 720 may comprise portions and/or components of either or both of the input device 714 and the output device 716. According to some embodiments, the input device 714 and/or the output device 716 may, for example, comprise and/or be embodied in an input/output and/or single device such as a touch-screen monitor (e.g., that enables both input and output via the interface 720). According to some embodiments, predictive model results (e.g., determined based on binary tree data derived from traversal of array-based binary tree storage structures) may be output via the output device 716.

In some embodiments, the communication device 718 may comprise any type or configuration of communication device that is or becomes known or practicable. The communication device 718 may, for example, comprise a Network Interface Card (NIC), a telephonic device, a cellular network device, a router, a hub, a modem, and/or a communications port or cable. In some embodiments, the communication device 718 may be coupled to provide data to a player device (not shown in FIG. 7), such as in the case that the apparatus 710 is utilized to provide a game interface to a player as described herein. The communication device 718 may, for example, comprise a cellular telephone network transmission device that sends signals indicative of game interface components to customer and/or subscriber handheld, mobile, and/or telephone device. According to some embodiments, the communication device 718 may also or alternatively be coupled to the processing device 712. In some embodiments, the communication device 718 may comprise an IR, RF, Bluetooth™, and/or Wi-Fi® network device coupled to facilitate communications between the processing device 712 and another device (such as a player device and/or a third-party device). According to some embodiments, predictive model results (e.g., determined based on binary tree data derived from traversal of array-based binary tree storage structures) may be output via the communication device 718.

The memory device 740 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of game instructions 742-1, predictive model instructions 742-2, player data 744-1, game data 744-2, tournament data 744-3, and/or prize data 744-4. In some embodiments, the game instructions 742-1, predictive model instructions 742-2, player data 744-1, game data 744-2, tournament data 744-3, and/or prize data 744-4 may be utilized by the processing device 712 to provide output information via the output device 716 and/or the communication device 718. In some embodiments, any or all of the predictive model instructions 742-2, the player data 744-1, game data 744-2, tournament data 744-3, and/or prize data 744-4 may be stored in one or more arrays in association with one or more binary trees as described herein.

According to some embodiments, the game instructions 742-1 may be operable to cause the processing device 712 to process player data 744-1, game data 744-2, tournament data 744-3, and/or prize data 744-4. Player data 744-1, game data 744-2, tournament data 744-3, and/or prize data 744-4 received via the input device 714 and/or the communication device 718 may, for example, be analyzed, sorted, filtered, decoded, decompressed, ranked, scored, plotted, and/or otherwise processed by the processing device 712 in accordance with the game instructions 742-1. In some embodiments, player data 744-1, game data 744-2, tournament data 744-3, and/or prize data 744-4 may be fed by the processing device 712 through one or more mathematical and/or statistical formulas and/or models in accordance with the game instructions 742-1 to provide online games influenced (e.g., by personalizing and/or customizing promotions, offers, and/or loyalty rewards) by results from predictive models resolved via traversal of array-based binary tree storage structures in accordance with embodiments described herein.

In some embodiments, the predictive model instructions 742-2 may be operable to cause the processing device 712 to process player data 744-1, game data 744-2, tournament data 744-3, and/or prize data 744-4. Player data 744-1, game data 744-2, tournament data 744-3, and/or prize data 744-4 received via the input device 714 and/or the communication device 718 may, for example, be analyzed, sorted, filtered, decoded, decompressed, ranked, scored, plotted, and/or otherwise processed by the processing device 712 in accordance with the predictive model instructions 742-2. In some embodiments, player data 744-1, game data 744-2, tournament data 744-3, and/or prize data 744-4 may be fed by the processing device 712 through one or more mathematical and/or statistical formulas, models, and/or array-based binary tree storage structures in accordance with the predictive model instructions 742-2 to provide one or more online games influenced (e.g., by personalizing and/or customizing promotions, offers, and/or loyalty rewards) by results from binary tree-based predictive models in a manner that requires less memory space and faster processing times than previous systems. According to some embodiments, the predictive model instructions 742-2 may be directed to resolution of any number of desired and/or practicable results, predictions, and/or estimations or conclusions. The predictive model instructions 742-2 may, for example, be directed to identifying patterns that suggest that an illicit activity is occurring (or has occurred). Currency withdrawals and/or switches between multiple payment methods and/or accounts may be monitored, for example, to identify potential money laundering activities. In some embodiments, such predictive model instructions 742-2 may take into account variables such as the number of payment methods and/or accounts utilized or held by a party, a number of times the party switches between and/or utilizes the various payment methods (e.g., in a predetermined period of time and/or specific time window), a number of times deposits are made utilizing the various methods, and/or a percentage of funds that is utilized for commercial activity (e.g., via a website) as compared to a total amount of available funds and/or an amount of funds withdrawn (e.g., without being utilized). Such predictive model instructions 742-2 may be utilized, for example, to flag possible (or likely) fraudulent or illicit activity and provide alerts and/or notifications to initiate measures to react to such activities.

In some embodiments, the predictive model instructions 742-2 may be direct to analyzing a member and/or account holder's spending habits, playing habits (e.g., in the case of wagering and/or pay-to-play gaming activities), currency deposit habits, game outcome history, and/or online session and/or game session duration history and/or frequency, such as to predict a likelihood of problem gambling activities and/or potential players "burnout" (e.g., excessive play and/or wagering that leads to abandonment of such activities by a member/player). According to some embodiments, the predictive model instructions 742-2 may be directed to predicting whether a given account holder and/or player is at risk of lapsing in their engagement with a particular website, game, software application, etc. The predictive model instructions 742-2 may analyze, for example, occurrences of and/or changes in various activities such as logging in, depositing currency, withdrawing currency, types and/or frequencies of online activities, types and/or frequencies of games played, chat participation levels, and/or participation in promotions.

According to some embodiments, the predictive model instructions 742-2 may be directed to analyzing or estimating a likelihood of a member, account, and/or player or customer becoming a high-value and/or VIP member, account, and/or player or customer. The predictive model instructions 742-2 may, for example, analyze member activities such as spending and/or playing activities and/or patterns to identify those members likely to exceed one or more predetermined thresholds (e.g., defining VIP status). In some embodiments, the predictive model instructions 742-2 may be utilized to implement member profiling logic to customize website and/or game presentation and/or provide customized and/or targeted advertisements and/or promotions, such as based on a member's "value" (e.g., calculated and/or perceived or predicted), behavior, characteristics, preferences, and/or propensity for risk. According to some embodiments, the predictive model instructions 742-2 may be utilized to determine a most appropriate and/or most likely effective manner and/or time to attempt to communicate with a member, account, and/or player. The manner in which the member/player has engaged with communications via various channels in the past, for example, may be analyzed utilizing a predictive model to determine the most likely effective communications channel and/or the most likely effective time to communicate with the member/player.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

In some embodiments, the apparatus 710 may comprise a cooling device 750. According to some embodiments, the cooling device 750 may be coupled (physically, thermally, and/or electrically) to the processing device 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Referring to FIG. 8A, FIG. 8B, FIG. 8C, FIG. 8D, and FIG. 8E, perspective diagrams of exemplary data storage devices 840a-e according to some embodiments are shown. The data storage devices 840a-e may, for example, be utilized to store instructions and/or data such as the game instructions 742-1, predictive model instructions 742-2, player data 744-1, game data 744-2, tournament data 744-3, and/or prize data 744-4, each of which is described in reference to FIG. 7 herein. In some embodiments, instructions stored on the data storage devices 840a-e may, when executed by a processor (such as the processor device 712 of FIG. 7), cause the implementation of and/or facilitate the method 500 described in conjunction with FIG. 5 herein, and/or portions thereof.

According to some embodiments, the first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 946, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 846*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, the second data storage device 840*b* may comprise a CD, CD-ROM, DVD, Blu-Ray™ Disc, and/or other type of optically-encoded disk and/or other storage medium that is or becomes know or practicable. In some embodiments, the third data storage device 840*c* may comprise a USB keyfob, dongle, and/or other type of flash memory data storage device that is or becomes know or practicable. In some embodiments, the fourth data storage device 840*d* may comprise RAM of any type, quantity, and/or configuration that is or becomes practicable and/or desirable. In some embodiments, the fourth data storage device 840*d* may comprise an off-chip cache such as a Level 2 (L2) cache memory device. According to some embodiments, the fifth data storage device 840*e* may comprise an on-chip memory device such as a Level 1 (L1) cache memory device.

The data storage devices 840*a-e* may generally store program instructions, code, and/or modules that, when executed by a processing device cause a particular machine to function in accordance with one or more embodiments described herein. The data storage devices 840*a-e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

VI. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "casual game", as the term is used herein (unless specified otherwise), may generally comprise (and in specific embodiments may be expressly limited to) a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

What is claimed is:

1. A method for deconstructing a binary tree into a plurality of arrays, the binary tree comprising a plurality of nodes and a plurality of leaves, comprising:
   assigning, by a specially-programmed processing device and to each node, a unique logical index;
   assigning, by the specially-programmed processing device and to each leaf, a unique logical index;
   storing, by the specially-programmed processing device and for each node, in at least one first array, (i) a state variable type, (ii) a threshold, (iii) a first pointer, and (iv) a second pointer;
   storing, by the specially-programmed processing device and for each leaf, in at least one second array, a prediction;
   executing, by the specially-programmed processing device, a predictive modelling application, wherein the execution of the predictive modelling application comprises:
      accessing the at least one first array; and
      retrieving, from the at least one first array, stored data indicative of the (i) state variable type, (ii) threshold, (iii) first pointer, and (iv) second pointer, each associated with a particular node from the plurality of nodes; and
   outputting, via an output device, a result of the predictive modelling application based on the retrieving data.

2. The method of claim 1, wherein the execution of the predictive modelling application further comprises:
   accessing the at least one second array; and
   retrieving, from the at least one second array, stored data indicative of the prediction associated with a particular leaf from the plurality of leaves.

3. The method of claim 2, wherein the execution of the predictive modelling application further comprises:
   determining, based on the data retrieved from the at least one first array and from the at least one second array, a result of the predictive modelling application; and
   outputting, via an output device in communication with the specially-programmed processing device, an indication of the result of the predictive modelling application.

4. The method of claim 1, wherein the at least one first array comprises four (4) arrays, each of the four (4) arrays storing, respectively, (i) the state variable type, (ii) the threshold, (iii) the first pointer, and (iv) the second pointer.

5. The method of claim 4, further comprising:
   combining, by the specially-programmed processing device, the two (2) arrays of the at least one first array that store the first and second pointers, into a two-dimensional matrix.

6. The method of claim 1, wherein the predictive modelling application comprises a Random Forest predictive modeling application.

7. The method of claim 1, wherein the predictive modelling application comprises a Gradient Boosting predictive modeling application.

8. The method of claim 1, wherein the state variable type for each node is descriptive of a different mathematical metric.

9. The method of claim 1, wherein at least one of the state variable types is descriptive of a difference between an amount of money a member wagers and an amount they win, over a particular period of time.

10. A system for executing a predictive model utilizing at least one binary tree, comprising:
   a processing device;
   an output device in communication with the processing device; and
   a memory device in communication with the processing device, the memory device storing (i) a plurality of arrays storing data descriptive of nodes and leaves of the binary tree, and (ii) specially-programmed instructions that define the predictive model, wherein the specially-programmed instructions, when executed by the processing device, result in:

retrieving the data descriptive of at least one node and at least one leaf from the plurality of arrays;

processing the retrieved data in accordance with the specially-programmed instructions that define the predictive model, wherein the processing comprises:

accessing at least one first array of the plurality of arrays; and retrieving, from the at least one first array, stored data indicative of (i) a state variable type, (ii) a threshold, (iii) a first pointer, and (iv) a second pointer, each associated with a particular node of the binary tree;

determining, based on the processing, a result of the predictive model; and outputting, via the output device, an indication of the result.

11. The system of claim 10, wherein the plurality of arrays stored in the memory device comprise the at least one first array storing data descriptive of the nodes of the binary tree and at least one second array storing data descriptive of the leaves of the binary tree.

12. The system of claim 11, wherein the at least one first array stores, for each node of the binary tree, data descriptive of (i) the state variable type, (ii) the threshold, (iii) the first pointer, and (iv) the second pointer.

13. The system of claim 11, wherein the at least one second array stores, for each leaf of the binary tree, data descriptive of a prediction.

14. The system of claim 11, wherein the at least one first array comprises four (4) arrays, each of the four (4) arrays storing, respectively, (i) the state variable type, (ii) the threshold, (iii) the first pointer, and (iv) the second pointer.

15. The system of claim 14, the two (2) arrays of the at least one first array that store the first and second pointers, comprise a two-dimensional matrix.

16. The system of claim 11, wherein the plurality of arrays further store a unique logical index for each node and leaf of the binary tree.

17. A non-transitory computer-readable medium storing a binary tree having a plurality of nodes and leaves, comprising:

a first array storing, for each node of the binary tree, a state variable type, and wherein each node is associated with a respective unique logical index;

a second array storing, for each node of the binary tree, a state variable threshold;

a third array storing, for each node of the binary tree, a left child index pointer;

a fourth array storing, for each node of the binary tree, a right child index pointer; and a fifth array storing, for each leaf of the binary tree, a prediction, and wherein each leaf is associated with a respective unique logical index and wherein the prediction is generated by execution of a predictive modelling application, wherein the execution of the predictive modelling application comprises:

accessing the first array; and retrieving, from the first array, stored data indicative of the (i) state variable type, (ii) threshold, (iii) first pointer, and (iv) second pointer, each associated with the particular respective node of the binary tree.

18. The non-transitory computer-readable medium of claim 17, wherein the unique logical indices of the nodes of the binary tree are assigned consecutively from zero (0) to the number of nodes "n" of the binary tree.

19. The non-transitory computer-readable medium of claim 18, wherein the unique logical indices of the leaves of the binary tree are assigned consecutively from the number of nodes "n" of the binary tree plus one ("n"+1) to the number of total nodes and leaves of the binary tree, "m".

* * * * *